US012511899B2

United States Patent
Li et al.

(10) Patent No.: US 12,511,899 B2
(45) Date of Patent: Dec. 30, 2025

(54) CROSS-DOMAIN FEW-SHOT VIDEO CLASSIFICATION WITH OPTICAL-FLOW SEMANTICS

(71) Applicant: NEC Laboratories America, Inc., Princeton, NJ (US)

(72) Inventors: Kai Li, Plainsboro, NJ (US); Renqiang Min, Princeton, NJ (US); Haifeng Xia, New Orleans, LA (US)

(73) Assignee: NEC Corporation, Tokyo (JP)

( * ) Notice: Subject to any disclaimer, the term of this patent is extended or adjusted under 35 U.S.C. 154(b) by 331 days.

(21) Appl. No.: 18/449,393

(22) Filed: Aug. 14, 2023

(65) Prior Publication Data

US 2024/0054783 A1   Feb. 15, 2024

Related U.S. Application Data

(60) Provisional application No. 63/397,959, filed on Aug. 15, 2022.

(51) Int. Cl.
| | |
|---|---|
| *G06V 20/40* | (2022.01) |
| *G06T 7/246* | (2017.01) |
| *G06V 10/774* | (2022.01) |
| *G06V 10/776* | (2022.01) |
| *G06V 10/82* | (2022.01) |

(52) U.S. Cl.
CPC .............. *G06V 20/41* (2022.01); *G06T 7/246* (2017.01); *G06V 10/774* (2022.01); *G06V 10/776* (2022.01); *G06V 10/82* (2022.01); *G06V 20/46* (2022.01); *G06T 2207/10016* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 11,074,454 B1 * | 7/2021 | Vijayanarasimhan | ...................... G06V 10/82 |
| 2019/0333198 A1 * | 10/2019 | Wang | ......................... G06T 5/70 |
| 2021/0232825 A1 * | 7/2021 | Tang | ...................... G06N 3/044 |

OTHER PUBLICATIONS

Optical Flow Guided Feature: A Fast and Robust Motion Representation for Video Action Recognition, Sun et al., 2018 IEEE/CVF Conference on Computer Vision and Pattern Recognition (Year: 2018).*

(Continued)

*Primary Examiner* — Vikkram Bali
(74) *Attorney, Agent, or Firm* — Vincent Duffy; Joseph Kolodka

(57) ABSTRACT

Methods and systems for video processing include extracting flow features and appearance features from frames of a video stream. The flow features are processed using a flow model that is trained on a first set of training data. An output of the flow model is processed using a sub-network that is trained on the first set of training data and a second set of domain-specific training data to generate a flow parameter. The appearance features are processed using an appearance model that is trained on the first set of training data and that further processes the appearance features using the flow parameter, to classify the frames of the video stream. An action is performed responsive to the classified frames.

20 Claims, 6 Drawing Sheets

(56) References Cited

OTHER PUBLICATIONS

Liu et al., "A Multi-Mode Modulator for Multi-Domain Few-Shot Classification", In Proceedings of the IEEE/CVF International Conference on Computer Vision 2021, Oct. 2021, pp. 8453-8462.

* cited by examiner

CROSS-DOMAIN FEW-SHOT VIDEO CLASSIFICATION WITH OPTICAL-FLOW SEMANTICS

RELATED APPLICATION INFORMATION

This application claims priority to U.S. Patent Application No. 63/397,959, filed on Aug. 15, 2022, incorporated herein by reference in its entirety.

BACKGROUND

Technical Field

The present invention relates to video classification and, more particularly, to few-shot video classification with optical-flow semantics.

Description of the Related Art

Video data has become increasingly plentiful, as individuals post video on a number of different hosting platforms. To understand the content of videos, machine learning systems are being developed to aid in classification. However, the training of a machine learning system often makes use of labeled samples, and generating such samples can be laborious.

SUMMARY

A method for video processing includes extracting flow features and appearance features from frames of a video stream. The flow features are processed using a flow model that is trained on a first set of training data. An output of the flow model is processed using a sub-network that is trained on the first set of training data and a second set of domain-specific training data to generate a flow parameter. The appearance features are processed using an appearance model that is trained on the first set of training data and that further processes the appearance features using the flow parameter, to classify the frames of the video stream. An action is performed responsive to the classified frames.

A system for video processing includes a hardware processor and a memory that stores a computer program. When executed by the hardware processor, the computer program causes the hardware processor to extract flow features and appearance features from frames of a video stream, to process the flow features using a flow model that is trained on a first set of training data, to process an output of the flow model using a sub-network that is trained on the first set of training data and a second set of domain-specific training data to generate a flow parameter, to process the appearance features using an appearance model that is trained on the first set of training data and that further processes the appearance features using the flow parameter, to classify the frames of the video stream, and to perform an action responsive to the classified frames.

A method for training a neural network includes training a flow model to process flow features of frames of a video stream, a sub-network to process outputs of the flow model, and an appearance model to process appearance features of the frames with a flow parameter from the sub-network, using a shared first set of training data. The sub-network is tuned while the flow model and the appearance model are held fixed, using a second set of domain-specific training data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Few-shot video classification is an approach to training a machine learning system that uses a relatively small number of labeled examples in a particular domain to fine-tune a pre-trained classifier, producing a deep classification model with high generalization. However, the training and test datasets may come from different sources, which can generate discrepancies in the distribution across them and can degrade performance by directly evaluating the well-trained model from the training set on divergent test videos.

Thus, the present embodiments provide cross-domain few-shot video classification. The training set may include many tasks, with each task involving a support set with a relatively small number of labeled videos and with one query set with unlabeled videos. The test dataset has organization similar to the training set. The videos in these sets may be collected from different sources and may belong to different categories.

Thus, a model is trained on a given action recognition dataset. The model is then deployed on another dataset, which has domain shifts relative to the training dataset and includes novel classes which are absent in the training dataset. Video data includes special types of information, such as temporal information and motion dynamics, that can make it more robust with respect to domain shifts. For example, video a person playing basketball indoors might have a very different appearance as compared to video of a person playing basketball outdoors, but the motion dynamics of the actions performed should be similar across the two different contexts.

Optical flows may be extracted to capture the motion dynamics of a video. A flow network branch is built to extract flow information. With flow features, a sub-network is added to produce parameters of a few layers of an appearance branch. In this manner, flow information can be used in tandem with the appearance features to address domain shift.

The entire neural network may be trained in a first step, including the appearance branch, the flow branch, and the sub-network, with a multi-class classification task. Parameters of the appearance branch and the flow branch can then be fixed while the sub-network is trained by itself with few-shot learning tasks. Each task may include a support set and a query set, where the support set includes labeled videos from a few sampled classes and the query set includes samples from the same classes as the support set. The classification risk is minimized for the query samples based on the support samples. As both the appearance branch and the flow branches are fixed, only the light-weight sub-network needs to be trained to enable it to swiftly adapt to a new environment and new classes. During testing, given a few-shot learning task from a test dataset, the support set is first used to update the sub-network and then the entire network is used to perform classification on the query samples.

Figure 1:
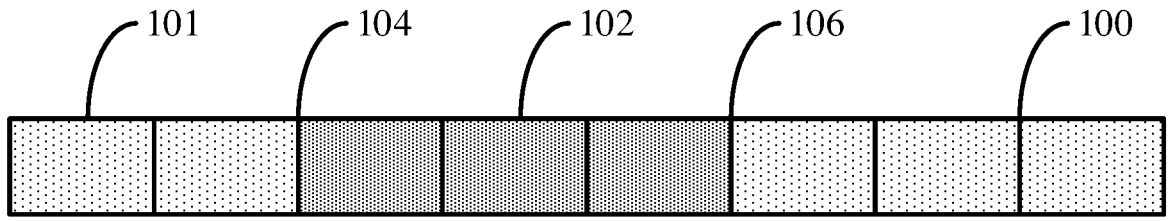
FIG. 1 is a diagram of a series of frames in a video stream being processed by a video classification task, in accordance with an embodiment of the present invention.

Referring now to FIG. 1, an exemplary video stream 100 is illustrated, being made up of a series of sequential video frames 101. Each video frame 101 may include an image that captures a camera's view at a particular time. Included in the video stream 100 is a series of action frames 102 that show a particular action taking place. The action frames 102 have a beginning time 104 and an ending time 106.

The video stream 100 may include labels that explicitly indicate the beginning time 104 and the ending time 106 of an action, and may further include a label that identifies the action taking place in the action frames 102. In a weakly annotated video stream, the video stream 100 may lack labels for the beginning time 104 and the ending time 106, but may still include a label that identifies the action as taking place somewhere within the video stream 100.

Each frame 101 includes multiple kinds of information. For example, each frame 101 may include appearance information that includes RGB values for each pixel of the frame 101, or any other appropriate encoding of static visual information. In addition, more than one frame 101 may be considered together to identify motion information, for example by identifying optical flow information that captures dynamic and motion information from one frame 101 to the next.

In one example of a video stream 100, the video stream 100 may capture a sporting event, such as a long jump. The action frames 102 may show the actual jump taking place, while frames 101 before and after the action frames 101 may show related or unrelated activity, such as the jumper's run leading up to the jump and the jumper landing and walking away. In a weakly annotated video stream, the exemplary video stream 100 may indicate that a jump is shown, without indicating which of the frames 101 in the video stream 100 represent the action frames 102.

From an annotation perspective, video-level labels are relatively easy to generate by a human being who views the video stream, while action localization labels that identify the beginning time 104 and ending time 106 take significantly more time to set with precision. Additionally, while a human being may have little difficulty identifying an action that is performed in multiple different visual contexts, a machine learning system may find the same task challenging.

Figure 2:
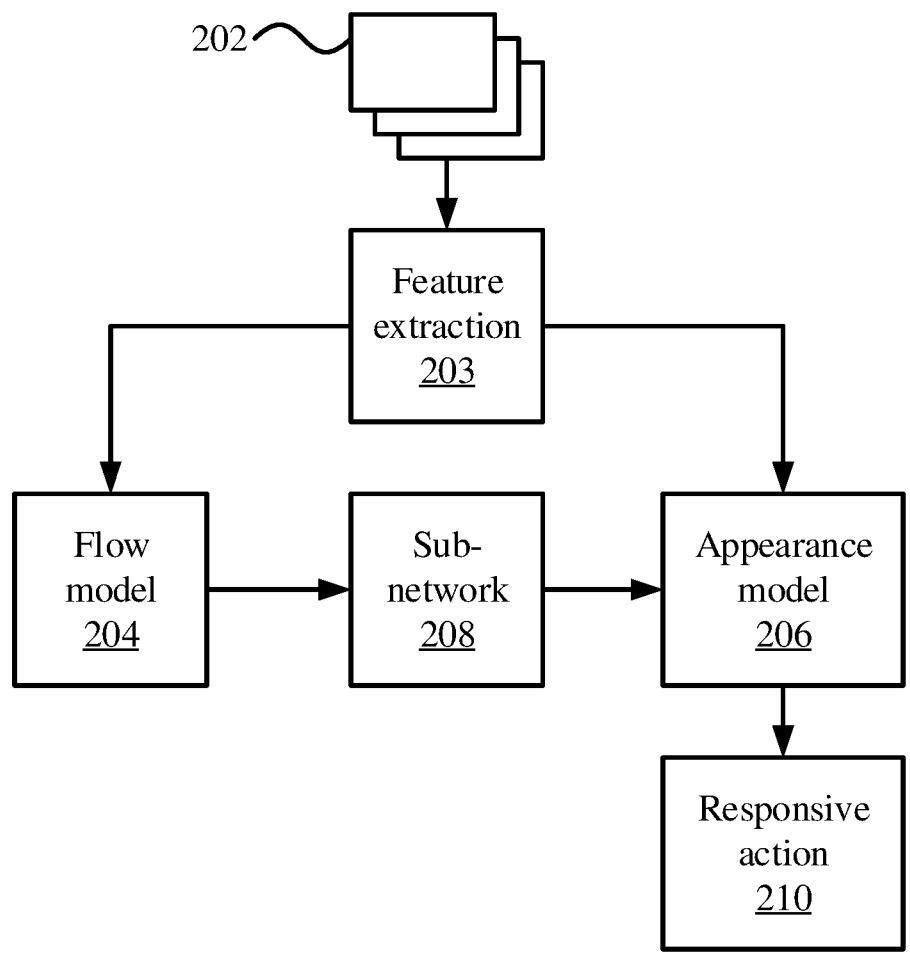
FIG. 2 is a block/flow diagram of a method/system for video processing that processes dynamic flow information and appearance information from an input video stream, in accordance with an embodiment of the present invention.

Referring now to FIG. 2, an overview of a video classification network is shown. A video stream 202 is processed by two separate branches, including a flow model 204 and an appearance model 206. The flow model 204 uses dynamic features of the video stream 202 to generate a feature map. The sub-network 208 processes the feature map output by the flow model 204 and generates additional inputs to the appearance model 206. The appearance model separately processes the video stream 202 to generate appearance vectors and, with input from the sub-network 208, classifies the video stream 202.

Feature extraction 203 may therefore extract flow features from the frames of the video stream 202, capturing motion information that is shown by the transition of one frame to the next. Feature extraction 203 may further extract appearance features from the pixel values (e.g., red, green, and blue values from each pixel) from individual respective frames of the video stream 202.

During operation, the flow model 204 and the sub-network 208 generate parameters that are used by the appearance model 206 for classification. The flow parameters $\alpha$ are applied in parallel to convolutional layers in the appearance branch 206 to bring flow information into the consideration of appearance features. Thus, the flow model 204 extracts a flow feature F, and the sub-network generates parameters $\alpha$ from the flow feature F.

The appearance model 206 generates a classification of the frames of the video stream 202 that can be used for subsequent downstream processing. In particular, an action can be performed 210 responsive to the classification. For example, action classification may be used in the context of a sporting event, where the responsive action may include automatically generating additional information relating to the detected action such as an identification of the actor, statistics relating to the actor or the detected action, and updates to the state of the sporting event based on the outcome of the action. For example, a duration of the action may be determined based on the starting time and ending time, and the duration may be used to report on or control the state of the event. Other uses for temporal action localization include security monitoring, for example identifying hazardous events in a video feed, and video labeling to segment videos based on semantic meaning to aid in summarizing important information from the video.

Figure 3:
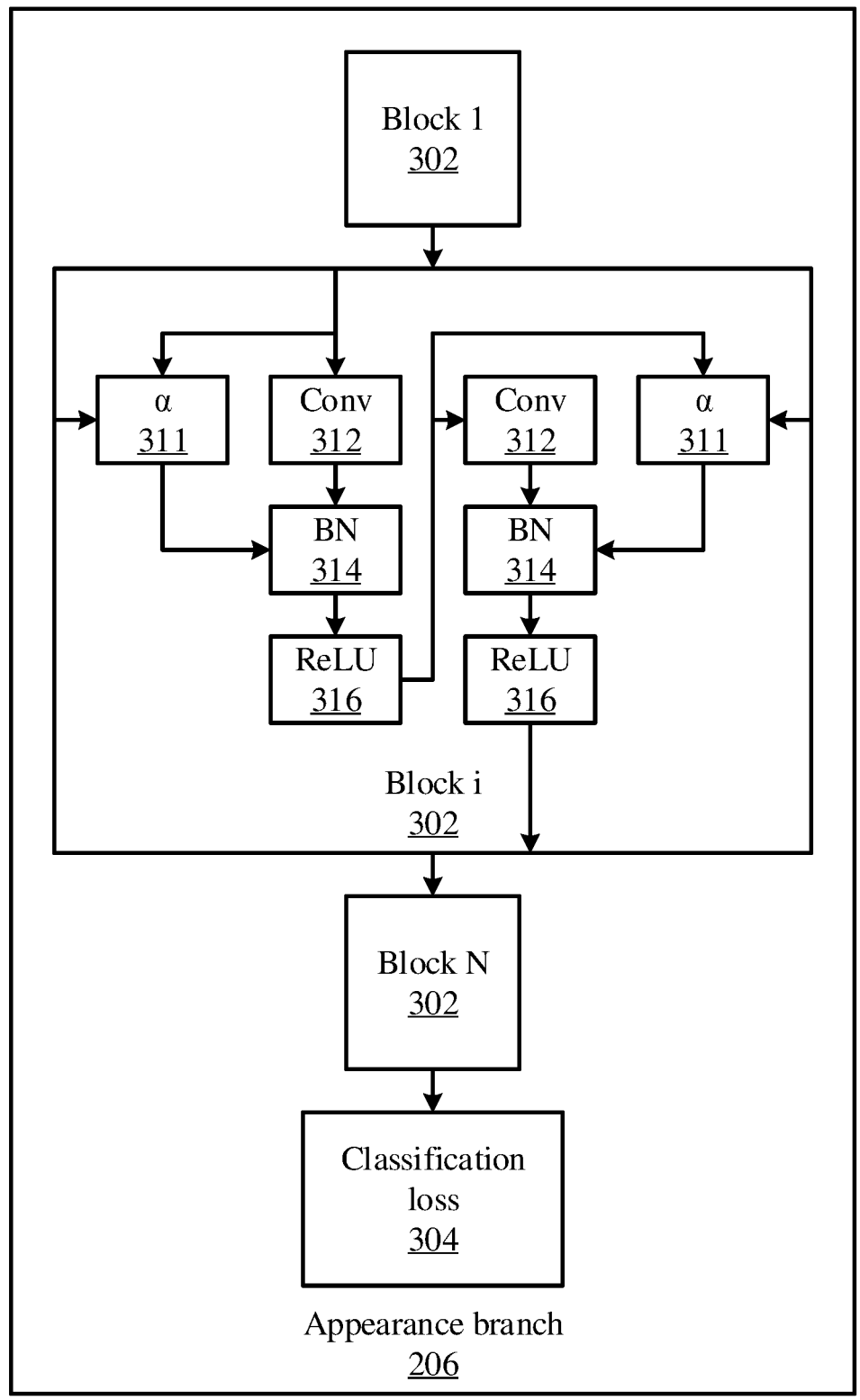
FIG. 3 is a block diagram of an appearance branch of a method/system for video processing that includes a parameter that characterizes flow information from an input video stream, in accordance with an embodiment of the present invention.

Referring now to FIG. 3, additional detail on the appearance branch 206 is shown. The appearance branch 206 may include a series of N blocks 302. Each block 302 includes a series of neural network components, for example including a convolutional block 312, a batch normalization (BN) block 314, and a rectified linear unit (ReLU) layer 316. This pattern may repeat within a given block 302. The convolutional layers 312 accept inputs from previous blocks 302 or from the video stream 202 itself.

Parallel to the convolutional blocks 312, the features are processed by parameters $\alpha$ from the sub-network 208. Thus, if the output of the previous layer is V, then the output of the $\alpha$ blocks 311 is $\alpha V$. The output of the $\alpha$ block 311 is added to the output of the convolutional block 312 as $\alpha V + Conv(V)$ and is used as input to the next layer.

The blocks 302 may have any appropriate neural network structure, for example being arranged as recurrent neural networks or transformers, or they may be implemented as convolutional networks as shown. Thus, in the exemplary implementation, each block 302 may include a convolutional layer 312, a batch normalization layer 314, and a ReLU layer 316, and may further include multiple iterations of that sequence. The flow parameters $\alpha$ 311 may introduced at each iteration, parallel to the respective convolutional layers 312.

The blocks 302 output a classification for the video stream. During training, this classification output is processed by a loss function 304 to determine error values that can be used to adjust parameters of the appearance model 206. The classification loss 304 is used to assign an error value to discrepancies between classification outputs and expected ground truth values during training, and may be implemented as any appropriate multi-class classification loss function, such as a cross-entropy loss.

Figure 4:
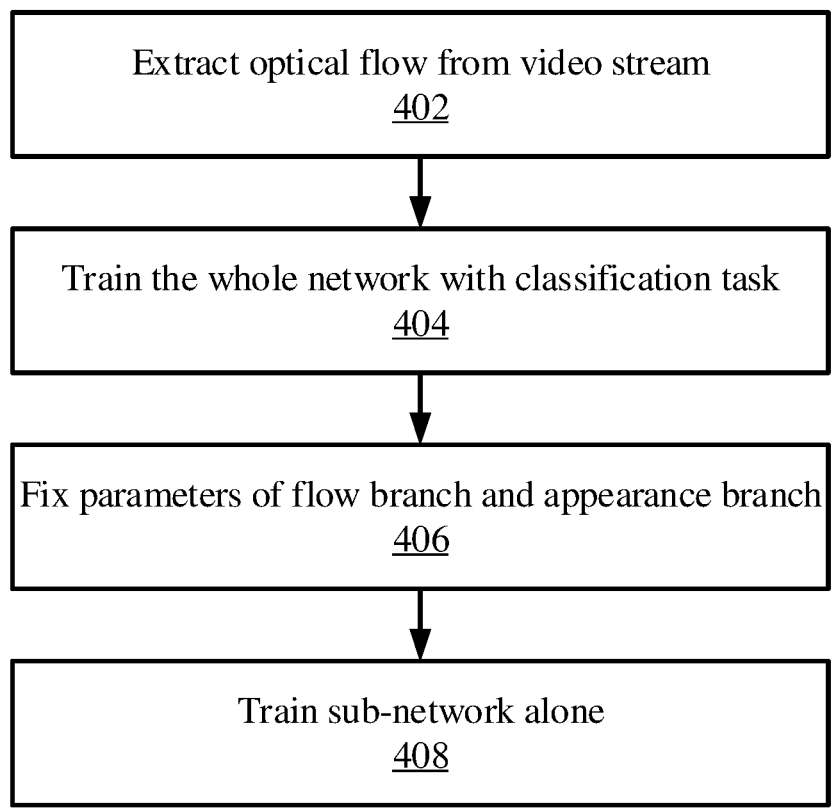
FIG. 4 is a block/flow diagram of training a neural network model using few-shot cross-domain adaptation, in accordance with an embodiment of the present invention.

Referring now to FIG. 4, a training method for the video classification network is shown. Block 402 extracts the optical flow and appearance features from video streams in an original training set pertaining to a particular domain. Block 404 trains the entire network, including the flow branch 204, the appearance branch 206, and the sub-network 208, using a multi-class classification task.

Block 406 then fixes the parameters of the flow branch 204 and the appearance branch 206 and block 408 trains only the sub-network with few-shot learning tasks, for example using domain-specific training data from a domain different from that of the original training set. The few-shot learning task may include a support set and a query set, with the support set including labeled videos from a number of sampled classes. The sub-network is trained to minimize the classification risk of the query samples.

The same classification loss 304 is used during training phases 404 and 408. The training of the sub-network 208 is performed with the tasks relating to the new domain. In this manner, the well-trained network of the flow model 204 and the appearance model 206 is preserved, while only the sub-network 208 is adapted responsive to the new inputs. This prevents adaptation to a new domain from disrupting the generalizability of the model for subsequent tasks.

Figure 5:
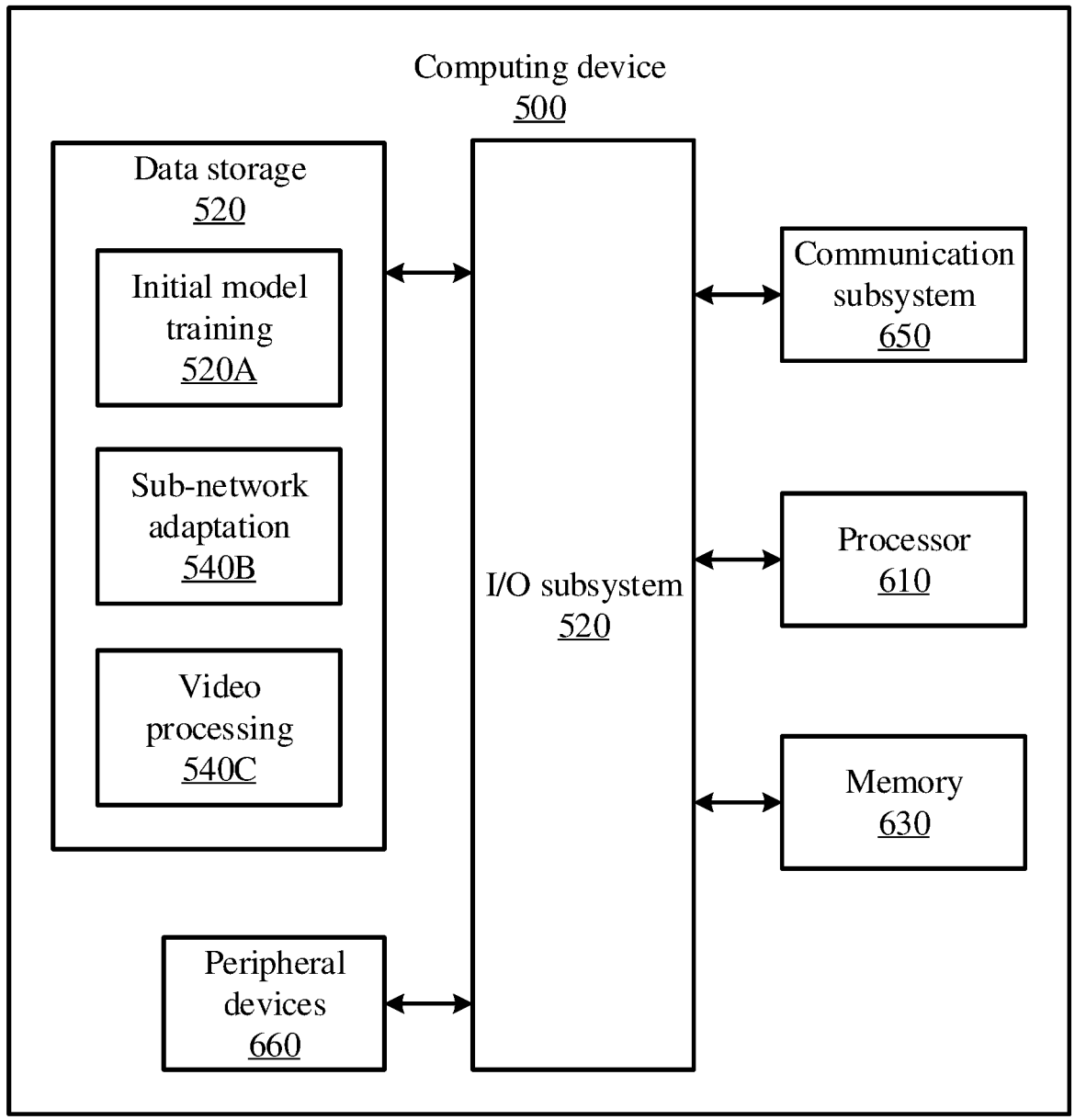
FIG. 5 is a block diagram of a computing device that performs few-shot cross-domain adaptation of a video processing model, in accordance with an embodiment of the present invention.

Referring now to FIG. 5, an exemplary computing device 500 is shown, in accordance with an embodiment of the present invention. The computing device 500 is configured to perform video processing.

The computing device 500 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 500 may be embodied as one or more compute sleds, memory sleds, or other racks, sleds, computing chassis, or other components of a physically disaggregated computing device.

As shown in FIG. 5, the computing device 500 illustratively includes the processor 510, an input/output subsystem 520, a memory 530, a data storage device 540, and a communication subsystem 550, and/or other components and devices commonly found in a server or similar computing device. The computing device 500 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 530, or portions thereof, may be incorporated in the processor 510 in some embodiments.

The processor 510 may be embodied as any type of processor capable of performing the functions described herein. The processor 510 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 530 may be embodied as any type of volatile or non-volatile memory or data storage capable of performing the functions described herein. In operation, the memory 530 may store various data and software used during operation of the computing device 500, such as operating systems, applications, programs, libraries, and drivers. The memory 530 is communicatively coupled to the processor 510 via the I/O subsystem 520, which may be embodied as circuitry and/or components to facilitate input/output operations with the processor 510, the memory 530, and other components of the computing device 500. For example, the I/O subsystem 520 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 520 may form a portion of a system-on-a-chip (SOC) and be incorporated, along with the processor 510, the memory 530, and other components of the computing device 500, on a single integrated circuit chip.

The data storage device 540 may be embodied as any type of device or devices configured for short-term or long-term storage of data such as, for example, memory devices and circuits, memory cards, hard disk drives, solid state drives, or other data storage devices. The data storage device 540 can store program code 540A for initial training, 540B for adapting the sub-network 208 to a new domain, and/or 540C for video processing. Any or all of these program code blocks may be included in a given computing system. The communication subsystem 550 of the computing device 500 may be embodied as any network interface controller or other communication circuit, device, or collection thereof, capable of enabling communications between the computing device 500 and other remote devices over a network. The communication subsystem 550 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 500 may also include one or more peripheral devices 560. The peripheral devices 560 may include any number of additional input/output devices, interface devices, and/or other peripheral devices. For example, in some embodiments, the peripheral devices 560 may include a display, touch screen, graphics circuitry, keyboard, mouse, speaker system, microphone, network interface, and/or other input/output devices, interface devices, and/or peripheral devices.

Of course, the computing device 500 may also include other elements (not shown), as readily contemplated by one of skill in the art, as well as omit certain elements. For example, various other sensors, input devices, and/or output devices can be included in computing device 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 500 are readily contemplated by one of ordinary skill in the art given the teachings of the present invention provided herein.

Figure 6:
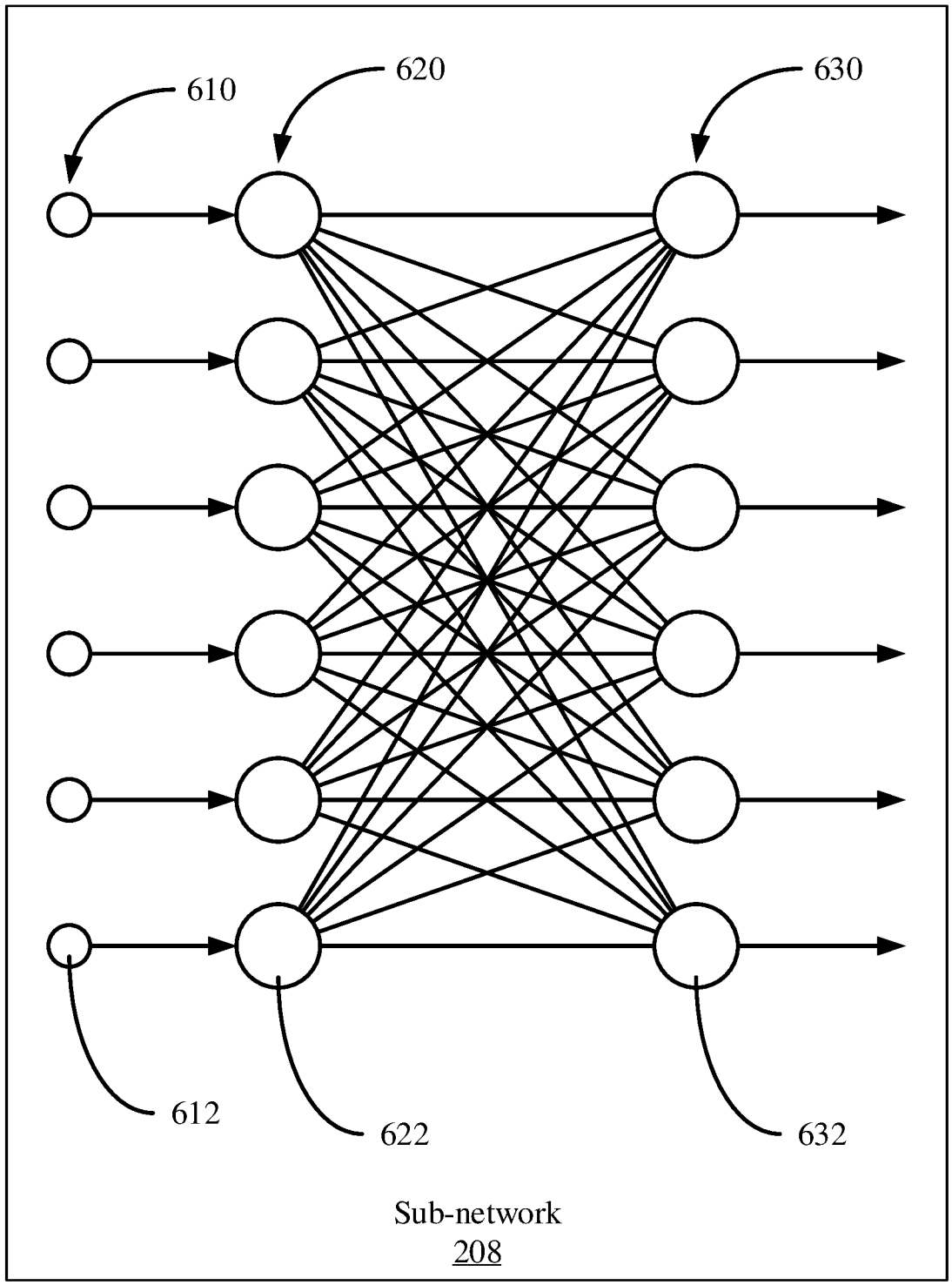
FIG. 6 is a diagram of an exemplary neural network architecture that may be used to implement parts of a video processing model, in accordance with an embodiment of the present invention.
Figure 7:
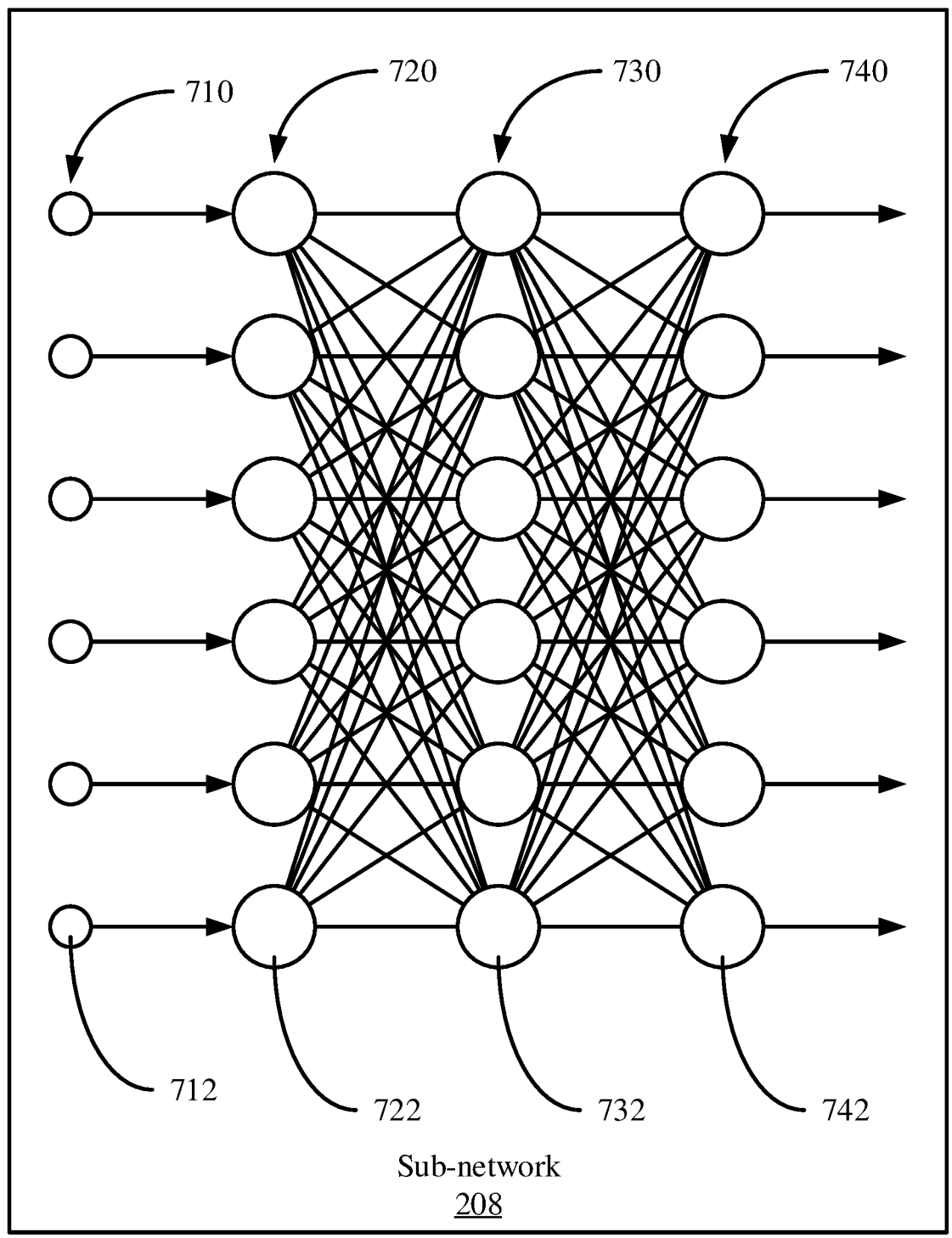
FIG. 7 is a diagram of an exemplary deep neural network architecture that may be used to implement parts of a video processing model, in accordance with an embodiment of the present invention.

Referring now to FIGS. 6 and 7, exemplary neural network architectures are shown, which may be used to implement parts of the present models, such as the sub-network 208. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 620 of source nodes 622, and a single computation layer 630 having one or more computation nodes 632 that also act as output nodes, where there is a single computation node 632 for each possible category into which the input example could be classified. An input layer 620 can have a number of source nodes 622 equal to the number of data values 612 in the input data 610. The data values 612 in the input data 610 can be represented as a column vector. Each computation node 632 in the computation layer 630 generates a linear combination of weighted values from the input data 610 fed into input nodes 620, and applies a non-linear activation function that is differentiable to the sum. The exemplary simple neural network can perform classification on linearly separable examples (e.g., patterns).

A deep neural network, such as a multilayer perceptron, can have an input layer 620 of source nodes 622, one or more computation layer(s) 630 having one or more computation nodes 632, and an output layer 640, where there is a single output node 642 for each possible category into which the input example could be classified. An input layer 620 can have a number of source nodes 622 equal to the number of data values 612 in the input data 610. The computation nodes 632 in the computation layer(s) 630 can also be referred to as hidden layers, because they are between the source nodes 622 and output node(s) 642 and are not directly observed. Each node 632, 642 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 632 in the one or more computation (hidden) layer(s) 630 perform a nonlinear transformation on the input data 612 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for video processing, comprising:
    extracting flow features and appearance features from frames of a video stream;
    processing the flow features using a flow model that is trained on a first set of training data;
    processing an output of the flow model using a sub-network that is trained on the first set of training data and a second set of domain-specific training data to generate a flow parameter;
    processing the appearance features using an appearance model that is trained on the first set of training data and that further processes the appearance features using the flow parameter, to classify the frames of the video stream; and
    performing an action responsive to the classified frames.

2. The method of claim 1, wherein processing the appearance features includes a convolutional network that processes the appearance features in parallel with the flow parameter.

3. The method of claim 2, wherein processing the appearance features includes adding a product of flow parameter and the appearance features to an output of the convolutional network.

4. The method of claim 1, wherein the appearance model includes a series of blocks, each of which includes a convolutional network and a respective instance of the flow parameter.

5. The method of claim 1, wherein the flow features characterize motion information relating to the frames of the video stream.

6. The method of claim 1, wherein the appearance features characterize pixel value information from the frames of the video stream.

7. The method of claim 1, wherein performing the action includes an action selected from the group consisting of generating additional information relating to the classified frames and performing a security action relating to the classified frames.

8. A system for video processing, comprising:
a hardware processor; and
a memory that stores a computer program which, when executed by the hardware processor, causes the hardware processor to:
   extract flow features and appearance features from frames of a video stream;
   process the flow features using a flow model that is trained on a first set of training data;
   process an output of the flow model using a sub-network that is trained on the first set of training data and a second set of domain-specific training data to generate a flow parameter;
   process the appearance features using an appearance model that is trained on the first set of training data and that further processes the appearance features using the flow parameter, to classify the frames of the video stream; and
   perform an action responsive to the classified frames.

9. The system of claim 8, wherein the computer program further causes the hardware processor to use a convolutional network that processes the appearance features in parallel with the flow parameter.

10. The system of claim 9, wherein the computer program further causes the hardware processor to add a product of flow parameter and the appearance features to an output of the convolutional network.

11. The system of claim 8, wherein the appearance model includes a series of blocks, each of which includes a convolutional network and a respective instance of the flow parameter.

12. The system of claim 8, wherein the flow features characterize motion information relating to the frames of the video stream.

13. The system of claim 8, wherein the appearance features characterize pixel value information from the frames of the video stream.

14. The system of claim 8, wherein the computer program further causes the hardware processor to perform action selected from the group consisting of generating additional information relating to the classified frames and performing a security action relating to the classified frames.

15. A computer-implemented method for training a neural network model, comprising:
   training a flow model to process flow features of frames of a video stream, a sub-network to process outputs of the flow model, and an appearance model to process appearance features of the frames with a flow parameter from the sub-network, using a shared first set of training data; and
   tuning the sub-network while the flow model and the appearance model are held fixed, using a second set of domain-specific training data.

16. The method of claim 15, wherein the appearance model includes a convolutional network that processes the appearance features in parallel with the flow parameter.

17. The method of claim 16, wherein the appearance model adds a product of flow parameter and the appearance features to an output of the convolutional network.

18. The method of claim 15, wherein the appearance model includes a series of blocks, each of which includes a convolutional network and a respective instance of the flow parameter.

19. The method of claim 15, further comprising extracting flow features from the frames to characterize motion information relating to the frames.

20. The method of claim 15, further comprising extracting appearance features from the frames to characterize pixel value information from the frames.

* * * * *